(12) United States Patent
Anderson

(10) Patent No.: US 11,117,582 B2
(45) Date of Patent: Sep. 14, 2021

(54) SINGLE PEDAL CONFIGURATION FOR ENGINE SPEED CONTROL AND VEHICLE BRAKING CONTROL

(71) Applicant: Caterpillar Inc., Deerfield, IL (US)

(72) Inventor: Randall T. Anderson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 285 days.

(21) Appl. No.: 16/427,117

(22) Filed: May 30, 2019

(65) Prior Publication Data

US 2020/0377099 A1 Dec. 3, 2020

(51) Int. Cl.
*B60W 30/18* (2012.01)
*B60W 10/06* (2006.01)
*B60W 10/18* (2012.01)

(52) U.S. Cl.
CPC ...... *B60W 30/18136* (2013.01); *B60W 10/06* (2013.01); *B60W 10/18* (2013.01); *B60W 2540/12* (2013.01); *B60W 2710/0644* (2013.01); *B60W 2710/18* (2013.01)

(58) Field of Classification Search
CPC .......... B60W 30/18136; B60W 10/06; B60W 10/18; B60W 2710/18; B60W 2540/12; B60W 2710/0644; B60W 30/143; B60W 2720/10; B60W 30/18109; B60W 2710/182; B60W 30/18063; B60W 2300/17; B60K 26/02; B60T 7/06

See application file for complete search history.

(56) References Cited

U.S. PATENT DOCUMENTS

| 5,957,811 A | 9/1999 | Gustafsson | |
|---|---|---|---|
| 2015/0329116 A1* | 11/2015 | Bulgrien | B60W 10/11 192/219.4 |
| 2019/0353243 A1* | 11/2019 | Yamada | F16H 61/143 |

FOREIGN PATENT DOCUMENTS

| FR | 2511642 A3 | 2/1983 | |
|---|---|---|---|
| GB | 2104463 A * | 3/1983 | B60W 10/04 |
| JP | 61215129 A | 9/1986 | |

\* cited by examiner

*Primary Examiner* — Marthe Y Marc-Coleman
(74) *Attorney, Agent, or Firm* — Harrity & Harrity LLP

(57) ABSTRACT

A vehicle controller may determine a decelerator input associated with controlling an engine speed of an engine of the vehicle. The vehicle controller may determine, while the vehicle is moving and based on the decelerator input satisfying a braking threshold, that an engine decelerator, associated with the decelerator input, is to be enabled for use in stopping the vehicle. The vehicle controller may determine, based on determining that the engine decelerator is to be used to cause the vehicle to be stopped, an amount of braking to be applied by a braking device of the vehicle to stop the vehicle. The vehicle controller may automatically cause the braking device to apply the amount of braking to stop the vehicle.

20 Claims, 4 Drawing Sheets

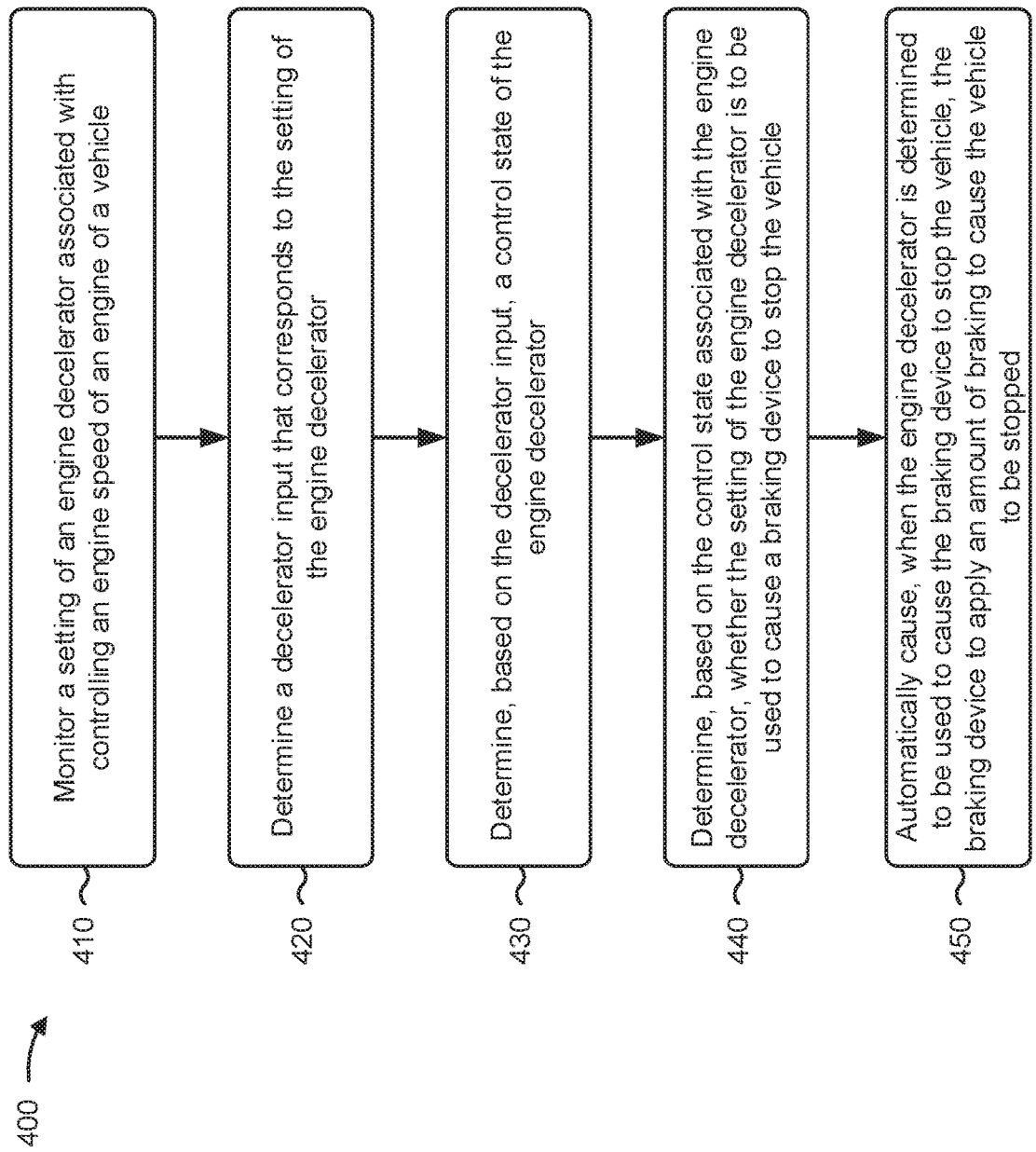

SINGLE PEDAL CONFIGURATION FOR ENGINE SPEED CONTROL AND VEHICLE BRAKING CONTROL

TECHNICAL FIELD

The present disclosure relates generally to vehicle control and, more particularly, to brake control using an engine decelerator.

BACKGROUND

A decelerator pedal for a vehicle (e.g., track-type tractor (TTT) machines) may be used to reduce an engine speed of an engine of the vehicle (e.g., by controlling an amount of fuel supplied to the engine). The decelerator pedal may be used in association with virtual gears (e.g., speed settings within a discrete mechanical gear) to reduce the engine speed to a particular virtual gear. Such a reduction in engine speed may correspondingly reduce a vehicle speed of the vehicle (e.g., a speed at which the vehicle is traveling). The vehicle may include a second pedal that is used to cause a braking device to apply braking to stop the vehicle or provide fine vehicle speed control (which may be referred to as "inching"). Accordingly, to slow the engine speed and/or stop the vehicle, an operator of the vehicle is required to utilize multiple pedals. Problems may arise if the user confuses which pedal is to be applied in a particular instance, resulting in potential catastrophic results (e.g., collision, injury, damage to the vehicle or other objects, and/or the like).

One attempt to control a vehicle is disclosed in Japanese Patent Reference No. JP61215129 dated Sep. 24, 1986 (referred to herein as the '129 reference). In particular, the '129 reference describes a brake device capable of operating both an engine brake and a service brake with only a brake pedal. In the '129 reference the brake device is used for a vehicle transmission and a gear change steering device having a hydrostatic mechanical continuously variable transmission mechanism.

While the brake device of the '129 reference may operate both an engine brake and a service brake, the '129 reference does not use an engine decelerator that adjusts an engine speed according to a transmission setting and does not enable a vehicle to be stopped using such an engine decelerator.

A vehicle controller of the present disclosure solves one or more of the problems set forth above and/or other problems in the art.

SUMMARY

According to some implementations, a vehicle controller may include one or more processors to determine a decelerator input associated with controlling an engine speed of an engine of the vehicle according to a transmission speed setting for a transmission associated with the engine; determine, while the vehicle is moving and based on the decelerator input satisfying a braking threshold, that an engine decelerator, associated with the decelerator input, is to be enabled for use in stopping the vehicle; determine, based on determining that the engine decelerator is to be used to cause the vehicle to be stopped, an amount of braking to be applied by a braking device of the vehicle to stop the vehicle; and automatically cause the braking device to apply the amount of braking to stop the vehicle.

According to some implementations, system of a vehicle may include an engine, an engine decelerator configured to adjust an engine speed of the transmission, a brake system that includes a braking device, and a vehicle controller configured to: monitor a decelerator input that corresponds to a setting of the engine decelerator; determine, based on a current decelerator input and a previous decelerator input, a control state associated with the engine decelerator; and perform, based on determining the control state and the decelerator input, an action to enable the engine decelerator to be used to at least one of: cause the braking device to stop the vehicle, or adjust the engine speed.

According to some implementations, a method may include monitoring a setting of an engine decelerator associated with controlling an engine speed of an engine of a vehicle; determining a decelerator input that corresponds to the setting of the engine decelerator; determining, based on the decelerator input, a control state of the engine decelerator; determining, based on the control state associated with the engine decelerator, whether the setting of the engine decelerator is to be used to cause a braking device to stop the vehicle; and automatically causing, when the engine decelerator is determined to be used to cause the braking device to stop the vehicle, the braking device to apply an amount of braking to cause the vehicle to be stopped.

BRIEF DESCRIPTION OF THE DRAWINGS

FIG. 4 is a flowchart of an example process associated with a single pedal configuration for engine speed control and vehicle braking control.

DETAILED DESCRIPTION

Figure 1:
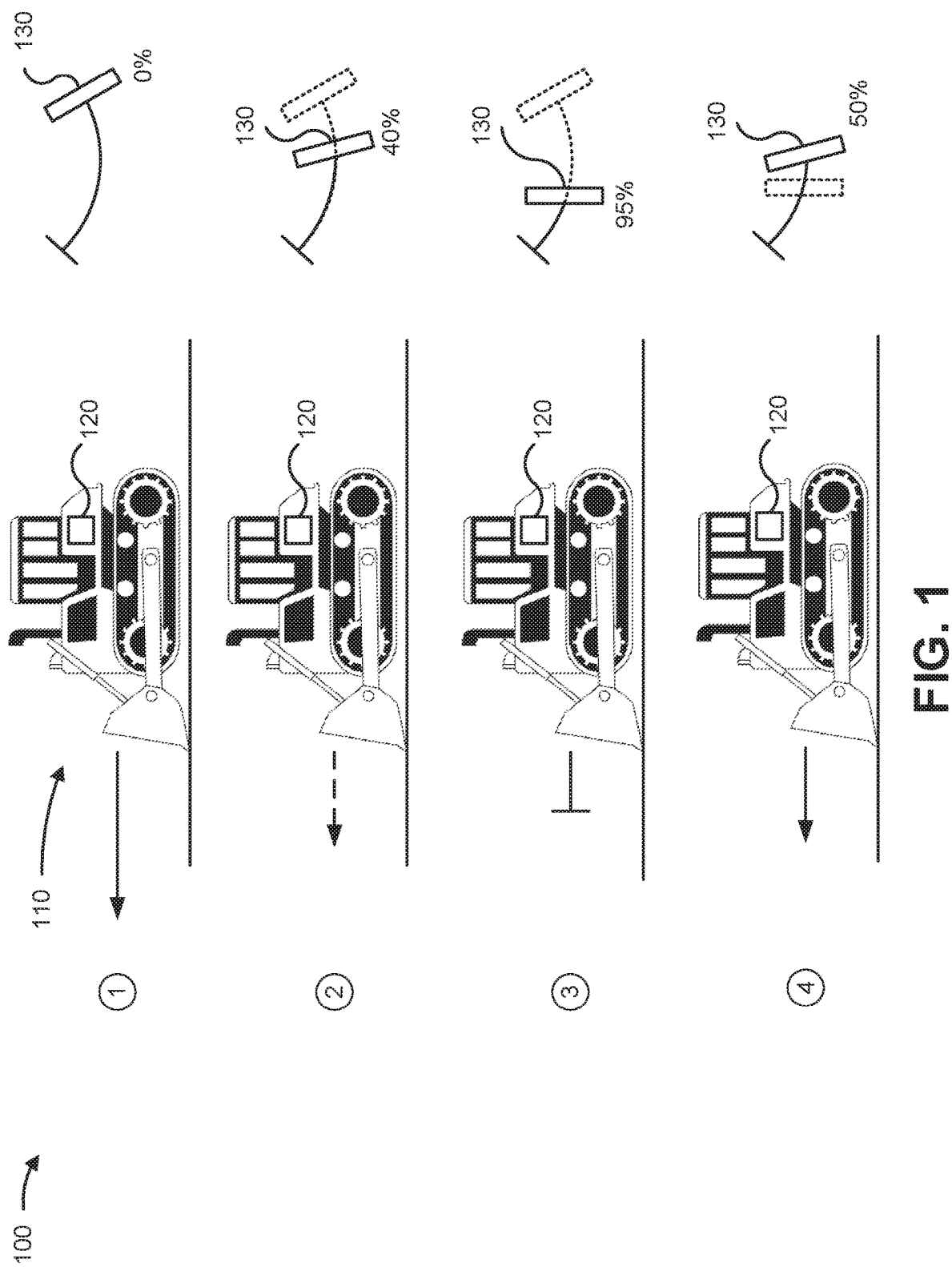
FIG. 1 is a diagram of an example implementation described herein.

FIG. 1 is a diagram of an example implementation 100 described herein. In example implementation 100, a vehicle 110 (shown as a track-type tractor (TTT) machine) is controlled (e.g., automatically) using a vehicle controller 120 and a decelerator pedal 130 (which may be referred to herein as an "engine decelerator"). As described herein, the vehicle controller 120 may configure decelerator pedal 130 to be used to adjust an engine speed of an engine of the vehicle (e.g., which may be a default mode, a standard operating mode, a normal operating mode, and/or the like for decelerator pedal 130). Furthermore, vehicle controller 120 may configure decelerator pedal 130 to be used to cause a braking device (e.g., service brakes of vehicle 110) to stop vehicle 110 and/or provide fine vehicle speed control (which may be referred to herein as "inching" or that enables the vehicle to "inch"). An operator of vehicle 110 may interact with the decelerator pedal 130 (e.g., press, release, and/or the like) to enable or permit vehicle controller 120 to adjust the engine speed and/or cause the braking device to stop the vehicle or provide fine vehicle speed control.

As shown in FIG. 1, and by phase 1 of example implementation 100, vehicle 110 is traveling forward (as shown by the solid arrow). For example, an operator and/or vehicle controller 120 (e.g., based on instructions from an operator) may set a speed for the vehicle. The vehicle speed may correspond to and/or be set based on a desired engine speed of an engine of vehicle 110 and/or a desired engine speed of vehicle 110. The desired engine speed (and/or a corresponding desired transmission speed) may be determined based on a decelerator input and a transmission speed setting (e.g., received via a user input from a control console and/or transmission control device that identifies a particular mechanical gear or virtual gear of the transmission).

The decelerator input may be any type of value (e.g., a value of a range, a percentage, and/or the like) that corresponds to a position of decelerator pedal 130. For example, a decelerator input may be a proportional representation of a position of decelerator pedal 130. In such a case, when decelerator pedal 130 is fully released (or disengaged), a decelerator input may be 0% (as shown in FIG. 1), a minimum value of a range, and/or the like; when decelerator pedal 130 is halfway engaged (e.g., halfway compressed), the decelerator input may be 50%, a midway value of a range, and/or the like; and, when decelerator pedal 130 is fully engaged (e.g., fully compressed) by the operator, the corresponding decelerator input may be 100%, a maximum value of a range, and/or the like. Vehicle controller 120 may determine the decelerator input from a mapping of positions of decelerator pedal 130 with corresponding decelerator inputs. For example, the mapping may include position information (e.g., a percentage of compression) of decelerator pedal 130 that is mapped with values (e.g., proportional representations of the position of decelerator pedal 130, non-proportional representations of the position of decelerator pedal 130, and/or the like) for decelerator inputs.

In this way, vehicle controller 120 may determine from a decelerator input associated with the position of decelerator pedal 130 that decelerator pedal 130 is to be used to adjust an engine speed (and/or is to be ignored if decelerator pedal 130 is not compressed).

As further shown in FIG. 1, and by phase 2 of example implementation 100, decelerator pedal 130 is compressed to a position corresponding to a decelerator input of 40%. Accordingly, vehicle controller 120 may identify or determine the decelerator input and cause an engine speed to be reduced based on the decelerator input. For example, if decelerator pedal 130 is compressed from 0% in phase 1 to 40% in phase 2, vehicle controller 120 may cause an amount of fuel supplied to an engine (or a fuel input rate) to be decreased such that the engine speed may be reduced from an engine speed that corresponds to a transmission speed setting without decelerator pedal 130 being compressed, to an engine speed that is determined from the transmission speed setting and decelerator pedal 130 being compressed to provide a decelerator input of 40%.

The decelerator input (40%) in phase 2 may be within a range (e.g., a default mode range, a deceleration mode range, and/or the like) in which vehicle controller 120 is to be used to slow the engine speed associated with vehicle 110. For example, based on decelerator pedal 130 moving from uncompressed in phase 1 to a position that indicates that decelerator pedal 130 is to be used to slow the engine, vehicle controller 120 may cause the engine speed to slow according to the position of decelerator pedal 130. In this way, in phase 2, vehicle controller 120 may use decelerator pedal 130 to slow an engine speed of an engine of vehicle 110.

As further shown in FIG. 1, and by phase 3 of example implementation 100, decelerator pedal 130 is nearly fully compressed corresponding to a decelerator input of 95%. As described herein, when decelerator pedal 130 is compressed to a braking threshold position (e.g., that corresponds to a decelerator input of approximately 80%, 90%, 95%, and/or the like), vehicle controller 120 may determine that the decelerator input has satisfied the braking threshold, and cause a braking device (e.g., service brakes of braking system) to apply an amount of braking to cause vehicle 110 to stop and/or to enable vehicle 110 to inch (e.g., move at a relatively slow speed (e.g., less than 1 kilometer per hour (kph), less than 2 kph, and/or the like), move in relatively short increments (e.g., less than 10 centimeter (cm) increments, less than 1 meter (m) increments, and/or the like). Accordingly, if the decelerator input (95%) in phase 3 satisfies the braking threshold, vehicle controller 120 may use the position of decelerator pedal 130 to determine that vehicle 110 is to be stopped, and correspondingly cause the braking device to stop vehicle 110.

According to some implementations, when vehicle controller 120 determines that a position of decelerator pedal 130 is to be used to control a braking device to stop vehicle 110 and/or to enable inching of vehicle 110, vehicle controller 120 may set an engine speed of vehicle 110 to a fixed value while controlling the braking. For example, the fixed value may be a braking engine speed value (e.g., 1000 revolutions per minute (RPM), 1200 RPM, 1500 RPM, and/or the like). The braking engine speed value may correspond to a minimum engine speed that can be reached using decelerator pedal 130 when decelerator pedal 130 is not used to control a braking device of vehicle 110. Accordingly, when vehicle controller 120 is to use decelerator pedal 130 to control braking of vehicle 110, vehicle controller 120 may cause an engine speed to be fixed, such that the engine speed is not dependent or based on the position of decelerator pedal 130 (and/or a corresponding decelerator input associated with decelerator pedal 130).

In this way, vehicle controller 120 may use the position of decelerator pedal 130 to control a braking device to stop vehicle 110 and/or enable inching of vehicle 110.

As further shown in FIG. 1, and by phase 4 of example implementation 100, decelerator pedal 130 is released to a position corresponding to a decelerator input of 50%. Vehicle controller 120 may read and/or receive the decelerator input (50%) and determine that the position of decelerator pedal 130 is no longer to be used to control braking. For example, if phase 4 follows phase 3 in example implementation 100, vehicle controller 120 may continue to use the position of decelerator pedal 130 to control braking of vehicle 110 while the received decelerator input is greater than 50% (while the position of decelerator pedal 130 corresponds to a decelerator input of greater than 50%). Accordingly, a threshold associated with the decelerator input that causes vehicle controller 120 to use a position of decelerator pedal 130 to initiate control of a braking device to stop vehicle 110 may be different than a threshold that causes vehicle controller 120 to return to using the position of decelerator pedal 130 to adjust an engine speed (e.g., by correspondingly controlling one or more devices to adjust the engine speed), as described herein.

To determine whether the position of decelerator pedal 130 is to be used to control braking of vehicle 110 and/or an engine speed of vehicle 110, vehicle controller 120 may determine a control state (e.g., a current control state) associated with decelerator pedal 130. For example, vehicle controller 120 may use a state machine (see FIG. 3) to determine a control state associated with vehicle controller 120. According to the state machine, a current control state may be determined based on the decelerator input and a previous control state associated with decelerator pedal 130, as defined by the state machine. The control state may be determined periodically, based on an event (e.g., a change in position of decelerator pedal 130), and/or the like. Vehicle controller 120 may determine that a current control state and a previous control state are a same control state. For example, vehicle controller 120 may determine that a current control state and a previous control state are the same at or during a startup operation of vehicle 110, if the decelerator pedal 130 did not pass a threshold that causes the control state to change between instances of vehicle controller 120 determining the control state, and/or the like. In such instances, vehicle controller 120 may not change or alter the use of decelerator pedal 130 with respect to controlling engine speed and/or a braking device to cause vehicle 110 to stop or inch.

Different control states may have different thresholds for the decelerator input that are to be used to change the control state of decelerator pedal 130. For example, if in a braking state (e.g., a control state in which decelerator pedal 130 is to be used to control braking of vehicle 110 to enable vehicle 110 to be stopped), a first threshold for the decelerator input may be used to switch to a deceleration state (e.g., a control state in which decelerator pedal 130 is to be used to control engine speed of vehicle 110). On the other hand, if decelerator pedal 130 is in the deceleration state, a second threshold for the decelerator input may be used to switch to the braking state. Accordingly, based on the control state and the decelerator input associated with decelerator pedal 130, vehicle controller 120 may determine whether the position of decelerator pedal 130 is to be used to control braking of vehicle 110 (e.g., to bring vehicle 110 to a stop and/or enable inching of vehicle 110) or an engine speed associated with vehicle 110.

Vehicle controller 120 may use a secondary braking threshold (e.g., that is different from a primary braking threshold corresponding to the braking threshold in phase 2) to cause decelerator pedal 130 to return to being used to stop vehicle 110 and/or enable inching of vehicle 110. Additionally, or alternatively, vehicle controller 120 may use a reset threshold (e.g., which may correspond to the position of decelerator pedal 130 in phase 2) that causes the primary braking threshold to be reached to return to using decelerator pedal 130 to be used to stop vehicle 110 and/or enable inching of vehicle 110.

Accordingly, in phase 4, once decelerator pedal 130 is returned to a position that satisfies a deceleration mode threshold, vehicle controller 120 may determine that decelerator pedal 130 is to return to being used to adjust the engine speed of vehicle 110 without being used to bring vehicle 110 to a stop or enable inching of vehicle 110 (e.g., vehicle controller 120 may use decelerator pedal 130 according to a default operation, a normal operation, and/or the like).

As indicated above, FIG. 1 is provided merely as an example. Other examples may differ from what is described with regard to FIG. 1.

Figure 2:
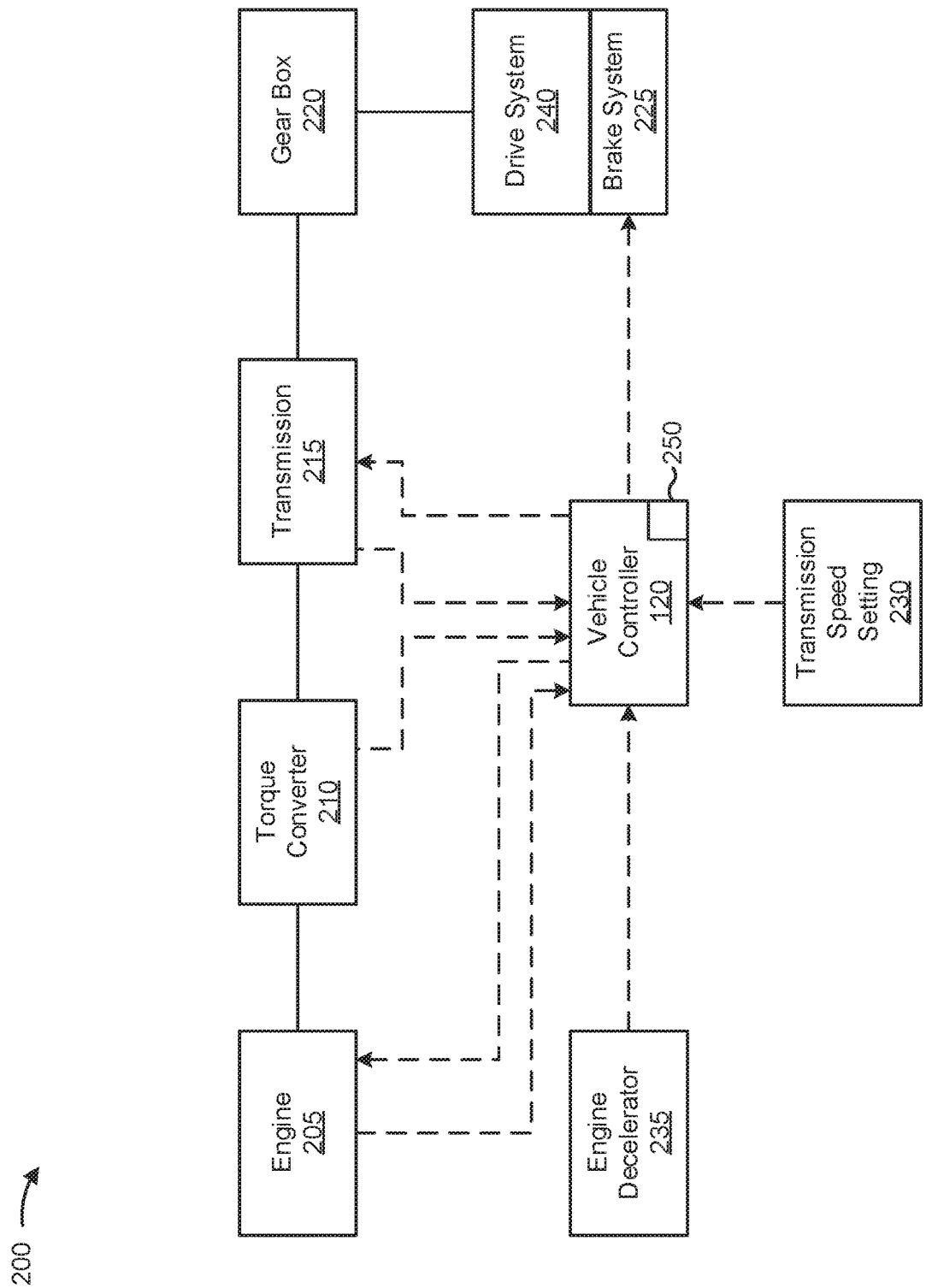
FIG. 2 is a diagram of an example configuration of a system in which systems and/or methods, described herein, may be implemented.

FIG. 2 is a diagram of an example system 200 in which systems and/or methods described herein may be implemented. As shown in FIG. 2, system 200 may include an engine 205, a torque converter 210, a transmission 215, a gear box 220, a brake system 225, a transmission speed setting 230, a drive system 240, an engine decelerator 235, and a vehicle controller 120 associated with a processor 250. Components of system 200 may interconnect via electrical connections (e.g., wired and/or wireless connections) (shown as dotted lines), mechanical connections (shown as solid lines), or a combination of electrical and mechanical connections. As described herein, system 200 may be a system of, or associated with, a vehicle (e.g., vehicle 110).

Engine 205 includes any power source capable of providing power (e.g., mechanical and/or electrical power) to one or more components of system 200. For example, engine 205 may include an internal combustion engine (ICE), such as a gasoline powered engine, a diesel engine, and/or the like. Additionally, or alternatively, engine 205 may include an electrically powered engine. As shown in system 200, engine 205 may provide power to torque converter 210. Accordingly, engine 205 may be a power source of the vehicle. In some implementations, vehicle controller 120 may provide a desired engine speed (e.g., which may correspond to a transmission speed setting) to engine 205 to control the speed of engine 205. Additionally, or alternatively, engine 205 may indicate an engine output speed (EOS) to vehicle controller 120.

Torque converter 210 includes a fluid coupling capable of transferring rotational power from a power source to a load. For example, torque converter 210 may include one or more mechanical components to transfer power from engine 205 to transmission 215. Accordingly, torque converter 210 can provide mechanical power transfer for the vehicle. In some implementations, vehicle controller 120 may monitor and/or receive a speed of torque converter 210 (e.g., torque converter output speed (TCOS), torque converter input speed (TCIS) (which may be equivalent to EOS), and/or the like) that may be used to determine an engine speed of engine 205 and/or a gear command of transmission 215.

Transmission 215 includes one or more mechanical elements (e.g., gears) configured to adjust a rotational power output from torque converter 210. Transmission 215 may be a powershift transmission with at least two discrete gear ratios. In some implementations, transmission 215 may include an automatic transmission that can be controlled by a controller (e.g., vehicle controller 120) based on one or more characteristics of transmission 215 and/or the vehicle (e.g., vehicle speed, load, torque output, and/or the like). For example, transmission 215 may receive a gear command, from vehicle controller 120, that may be used to shift gears of transmission 215. A transmission speed (e.g., a transmission input speed (TIS) (which may be equivalent to TCOS) or transmission output speed (TOS)) may be provided from transmission 215 to vehicle controller 120.

Gear box 220 includes one or more mechanical elements (e.g., gears) configured to provide power to one or more drives of drive system 240 and steer the vehicle associated with system 200 based on the power applied to the drive system 240. In some implementations, gear box 220 may provide steering by differentially driving a first drive and a second drive of drive system 240. In some implementations, gear box 220 may be configured to provide power to steer the vehicle, in a first direction, equally to each of the first drive and the second drive, but in opposite directions. Accordingly, gear box 220 mechanically transfers an appropriate amount of power to drive system 240 to move and/or steer the vehicle.

Brake system 225 includes one or more mechanical elements to provide braking to the vehicle. For example, brake system 225 may include one or more braking devices (e.g., service brakes, such as brake discs, brake drums, brake pads, and/or the like) to mechanically slow one or more drives of drive system 240. As such, when brake system 225 is to apply brakes, brake system 225 may actuate one or more of the braking devices to cause the one or more drives of drive system 240 to slow. In some implementations, brake system 225 may include a hydraulic system (e.g., a hydraulic pump, a hydraulic circuit, and/or the like) to actuate one or more braking devices of brake system 225. As described herein, when braking to stop the vehicle is enabled (e.g., based on a decelerator input from engine decelerator 235, a control state associated with engine decelerator 235, and/or the like), brake system 225 may apply braking based on instructions from vehicle controller 120. Brake system 225 may apply variable amounts of brake pressure (e.g., corresponding to various percentages of brake pressure, various thresholds of brake pressure, and/or the like) to one or more mechanical braking devices of brake system 225, according to instructions from vehicle controller 120. For example, when applying 100% brake pressure, no mechanical slip may be allowed within brake system 225 (e.g., to stop the vehicle), while, when applying less than 100% brake pressure, brake system 225 may allow some corresponding mechanical slip within brake system 225 (e.g., to slow the vehicle and/or enable inching of the vehicle).

Transmission speed setting 230 includes one or more devices capable of providing speed settings (e.g., transmission speed settings, vehicle speed settings, and/or the like) to vehicle controller 120. In some implementations, transmission speed setting 230 may include one or more mechanical user interfaces (e.g., a gear lever, a gear shifter, and/or the like) or electrical user interfaces (e.g., a keypad, a touchscreen, a joystick, and/or the like). Transmission speed setting 230 may provide speed inputs (e.g., transmission speed settings, vehicle speed settings, and/or the like) to vehicle controller 120 to enable vehicle controller 120 to control speeds of transmission 215 (e.g., in association with a decelerator input from engine decelerator 235).

Drive system 240 includes one or more components to drive the vehicle. For example, drive system 240 may be one or more axles connected to one or more tracks, wheels, and/or the like. Drive system 240 may be configured with gear box 220 to provide differential steering of the vehicle.

Engine decelerator 235 includes one or more mechanical or electrical input devices to enable an operator to indicate that an engine speed of engine 205 is to be decelerated. Engine decelerator 235 may correspond to decelerator pedal 130 of FIG. 1. Engine decelerator 235 may include a user interface (e.g., a mechanical or electrical user interface) to enable an operator to decrease the amount of fuel to engine 205 via vehicle controller 120. As a more specific example, the operator may compress a decelerator pedal that causes engine decelerator 235 to provide a decelerator input to vehicle controller 120 to cause vehicle controller 120 to decrease the desired engine speed of engine 205. The decelerator input may correspond to a setting of engine decelerator 235 (e.g., a position of a decelerator pedal, an input value of a user interface, and/or the like). In some instances, the greater the decelerator input of engine decelerator 235, the less fuel that vehicle controller 120 is to supply to engine 205. In some implementations, engine decelerator 235 may be monitored as an input to determine a vehicle speed setting for the vehicle and/or determine whether braking is to be applied within brake system 225. For example, when engine decelerator 235 is activated (e.g., by an operator pressing a decelerator pedal associated with engine decelerator 235), vehicle controller 120 may determine that the vehicle is to slow down (e.g., slower than the current vehicle speed) and/or that the vehicle is to be stopped (e.g., the vehicle speed is to equal 0 kph). Therefore, vehicle controller 120 may determine (e.g., from one or more thresholds associated with the decelerator input of engine decelerator 235, from a control state associated with engine decelerator 235, from transmission speed setting 230, and/or the like) whether brake system 225 is to apply brake pressure and/or how much brake pressure is to be applied.

As described herein, engine decelerator 235 may provide a decelerator input to vehicle controller 120 to permit vehicle controller 120 to determine whether engine decelerator 235 is to be used to stop the vehicle and/or enable inching of the vehicle. For example, one or more thresholds (e.g., one or more braking thresholds, one or deceleration mode thresholds, and/or the like) may be used to configure engine decelerator 235 for use in stopping the vehicle or enabling inching of the vehicle.

Vehicle controller 120 may include one or more apparatuses for controlling one or more components of system 200. Vehicle controller 120 includes processor 250, which is implemented in hardware, firmware, or a combination of hardware and software. Processor 250 may include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 250 may be capable of being programmed to perform a function. Vehicle controller 120 may include (and/or processor 250 may be communicatively coupled with) one or more memories, including a random access memory (RAM), a read only memory (ROM), and/or another type of dynamic or static storage device (e.g., a flash memory, a magnetic memory, and/or an optical memory) that stores information and/or instructions for use by vehicle controller 120.

Vehicle controller 120 may receive one or more inputs from one or more components of system 200 and/or from one or more sensors associated with the components of system 200, and provide an output to control system 200 based on the one or more inputs. For example, vehicle controller 120 may receive an input signal from engine decelerator 235 and/or transmission speed setting 230 to generate an output signal to apply brakes of brake system 225 and/or to decrease a desired engine speed of engine 205. Vehicle controller 120 may determine an amount of braking (e.g., an amount of brake pressure) that is to be applied based on inputs from engine decelerator 235 and transmission speed setting 230. For example, vehicle controller 120 may use a data structure (e.g., a database, a table, an index, and/or the like) that indicates an amount of brake pressure to be applied when transmission 215 indicates a particular transmission speed and/or when vehicle controller 120 determines that the vehicle is moving at a particular vehicle speed. In some implementations, the faster the transmission speed and/or the faster the vehicle is moving, the greater the amount of brake pressure that is to be applied by brake system 225. In such cases, the relationship between the amount of braking (or brake pressure) that is applied and the transmission speed and/or vehicle speed can be linear, exponential, pre-configured, and/or the like. Accordingly, vehicle controller 120 may be used to automatically apply braking for the vehicle to ensure the vehicle remains at a particular speed (e.g., during a decline).

Vehicle controller 120 may configure engine decelerator 235 to be used to cause the vehicle to stop, using one or more braking devices of braking system 225. For example, based on a decelerator input satisfying a threshold (e.g., a braking threshold) from engine decelerator 235, vehicle controller 120 may use the decelerator input to cause braking system 225 to apply a corresponding amount of braking to reduce speeds of drives of drive system 240. Additionally, or alternatively, the vehicle controller 120 may determine that the decelerator input satisfies another threshold (e.g., a deceleration threshold) to return to controlling the engine speed (without controlling the braking to cause the vehicle to stop and/or inch).

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, separate, and/or distributed components. Additionally, or alternatively, a set of components (e.g., one or more components) of system 200 may perform one or more functions described as being performed by another set of components of system 200.

Figure 3:
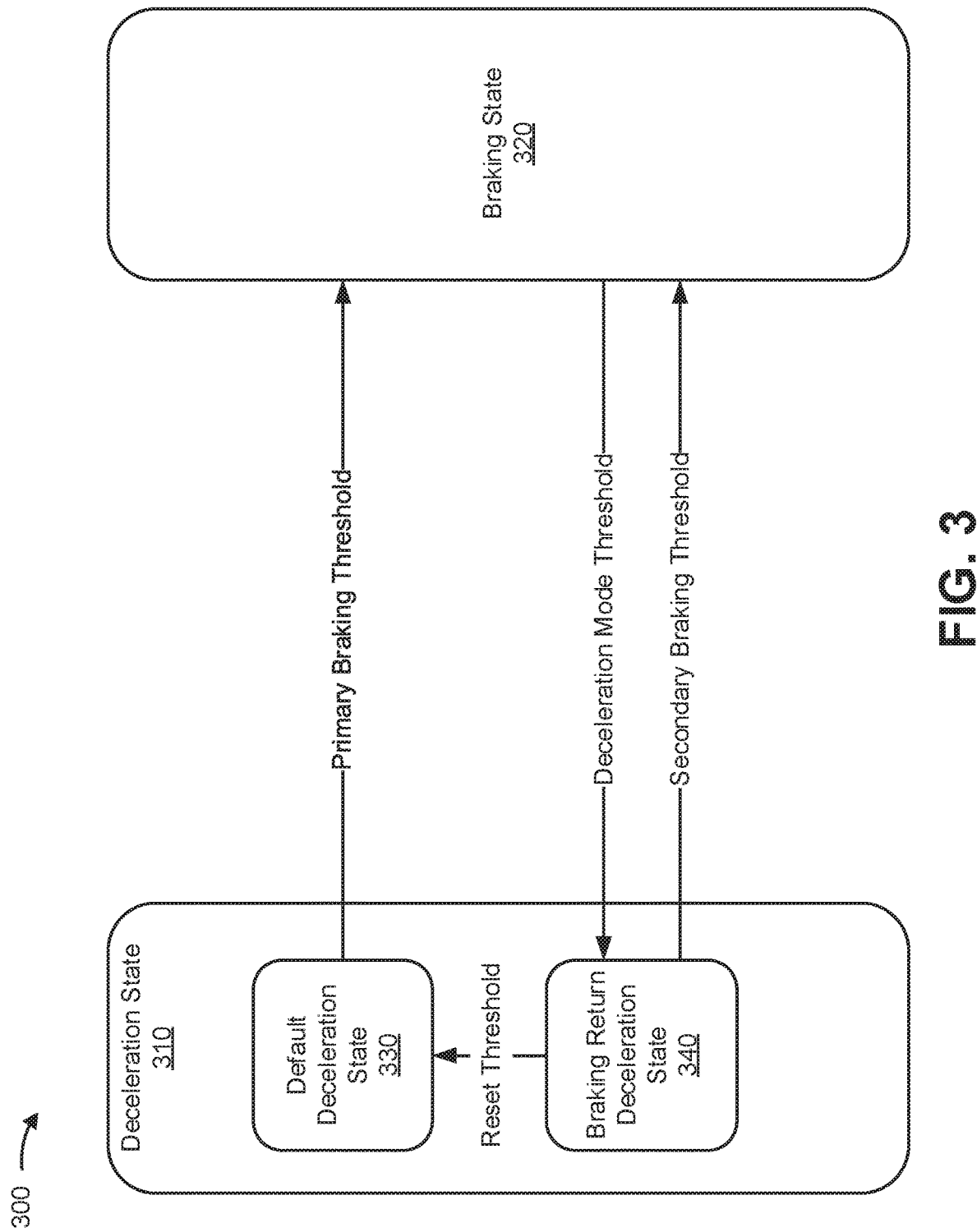
FIG. 3 is a diagram of an example state machine for use in an example implementation described herein.

FIG. 3 is a diagram of an example state machine 300 for use in an example implementation described herein. State machine 300 may represent control states associated with an engine decelerator (e.g., decelerator pedal 130, engine decelerator 235, and/or the like) of a vehicle (e.g., vehicle 110). Vehicle controller 120 may use state machine 300 to control one or more components of system 200 according to a decelerator input from the engine decelerator and the control state of a decelerator control (e.g., the current state of the engine decelerator). For example, vehicle controller 120 may control engine 205, transmission 215, brake system 225, and/or the like according to a decelerator input from engine decelerator 235, depending on the current state of the engine decelerator.

As shown in FIG. 3, state machine 300 includes a deceleration state 310 and a braking state 320. Deceleration state 310 includes a default deceleration state 330 and a braking return deceleration state 340. When control is in the deceleration state (e.g., when the current control state of the engine decelerator is default deceleration state 330 or braking return deceleration state 340), vehicle controller 120 is to use the decelerator input to adjust (e.g., control one or more devices to adjust) a speed of an engine (e.g., engine 205). Further, when decelerator control is in the braking state (e.g., when the current state of the engine decelerator is braking state 320), vehicle controller 120 is to use the decelerator input to control a braking device (e.g., a braking device of brake system 225) to cause the vehicle to stop and/or enable the vehicle to inch. While in the braking state, vehicle controller 120 may fix or latch an engine speed of an engine of the vehicle (e.g., to a fixed braking engine speed value). In this way, a position of the decelerator pedal may not adjust the engine speed while decelerator control is in the braking state and/or while the decelerator input is used by vehicle controller 120 to cause a braking device to apply braking to stop or inch the vehicle.

As described herein, decelerator control may transition between control states (e.g., braking state 320, default deceleration state 330, and braking return deceleration state 340) when vehicle controller 120 determines that the decelerator input satisfies a corresponding threshold. Vehicle controller 120 may determine that the decelerator input satisfies the corresponding threshold when the decelerator is greater than, equal to, or less than the corresponding threshold for a threshold length of time (e.g., 0.1 seconds, 0.2 seconds, 0.5 seconds, and/or the like).

At startup (e.g., of a vehicle, of vehicle controller 120, and/or the like), decelerator control may start in default deceleration state 330. Accordingly, vehicle controller 120 may use the decelerator input to adjust an engine speed (e.g., by controlling one or more devices associated with providing fuel to the engine) without enabling a braking device to apply brakes to stop the vehicle and/or inch the vehicle. For example, vehicle controller 120 may adjust an engine speed according to a setting of engine decelerator 235. More specifically, vehicle controller 120 may adjust the engine speed based on a range of the decelerator input being between 0% and 100% (and/or between 0% and a primary braking threshold). Accordingly, if the decelerator input is 0%, vehicle controller 120 may not adjust the engine speed. Further, if the decelerator input is at 50% (e.g., of the primary braking threshold), vehicle controller 120 may adjust the engine speed to midway between a maximum engine speed (for the transmission speed setting) and a minimum engine speed (for the transmission speed setting). Moreover, when the decelerator input is at 100% (and/or the primary braking threshold), vehicle controller 120 may latch the engine speed to a minimum engine speed.

When the decelerator input satisfies a primary braking threshold, decelerator control may advance to braking state 320. Once in braking state 320, vehicle controller 120 may use the decelerator input to control the braking device to cause the vehicle to stop, inch, or move at a corresponding vehicle speed until the decelerator input satisfies a deceleration mode threshold (e.g., 50%, 60%, 65%, and/or the like).

While decelerator control is in braking state 320 (e.g., while the decelerator input satisfies (e.g., is greater than an amount of compression of a corresponding decelerator pedal) the deceleration mode threshold), the vehicle controller 120 may use the decelerator input to cause a braking device to apply an amount of braking that corresponds to the decelerator input. The amount of braking may correspond to a range of the decelerator input between the deceleration mode threshold and a maximum decelerator input. Vehicle controller 120 may determine the amount of braking to be proportional to the decelerator input within the range. Additionally, or alternatively, vehicle controller 120 may determine the amount of braking based on a mapping of decelerator inputs with amounts of braking, and/or the like.

The amount of braking may correspond to a target vehicle speed associated with the decelerator input. For example, when the decelerator input is 100% (e.g., fully compressed), the target vehicle speed is to be 0 kph (or stopped). Further, as the decelerator input is reduced (e.g., from 100% toward the deceleration mode threshold), vehicle controller 120 may cause the braking device to reduce the amount of braking that is applied to permit the vehicle to move (e.g., to allow the vehicle to inch), but using a target vehicle speed that corresponds to the decelerator input. Accordingly, when in the braking state, the target vehicle speed may be 0 kph when the primary braking threshold is satisfied, and the target vehicle speed may be a variable speed that corresponds to the decelerator input when the decelerator input is reduced below the braking threshold (or a maximum decelerator input, such as 100%). In some implementations, there may be a maximum target vehicle speed while the decelerator control is in the braking state. For example, the maximum target vehicle speed may be a maximum vehicle speed that can be used to inch the vehicle or permit fine vehicle speed control of the vehicle.

Vehicle controller 120 may use any suitable technique to determine an amount of braking that is to be applied. For example, vehicle controller 120 may monitor an actual speed of the vehicle (e.g., the speed at which the vehicle is traveling) as feedback. In such an example, based on a comparison of the target vehicle speed and the actual vehicle speed, determine braking that is to be applied. Additionally, or alternatively, vehicle controller 120 may use a mapping of the target vehicle speed, the actual vehicle speed, and/or a difference between the target vehicle speed with a corresponding amount of braking that is to be applied by a braking device to control the braking of the vehicle and/or vehicle speed of the vehicle When the decelerator input satisfies the deceleration mode threshold, decelerator control may return to deceleration state 310 by advancing to braking return deceleration state 340. Accordingly, when vehicle controller 120 determines that the decelerator input satisfies the deceleration mode threshold, vehicle controller 120 may use the decelerator input to adjust an engine speed of the vehicle (e.g., without applying braking that would cause the vehicle to stop or inch). For example, vehicle controller 120 may adjust an engine speed according to a setting of engine decelerator 235. More specifically, vehicle controller 120 may adjust the engine speed based on a range of the decelerator input being between a reset threshold (e.g., 12%, 5%, 0%, and/or the like) and the deceleration mode threshold. Accordingly, if the decelerator input is less than or equal to the reset threshold, vehicle controller 120 may not adjust the engine speed. Further, if the decelerator input is midway between the reset threshold and the deceleration mode threshold, vehicle controller 120 may adjust the engine speed to midway between a maximum engine speed (for the transmission speed setting) and a minimum engine speed (for the transmission speed setting). Moreover, when the decelerator input is at or greater than the deceleration mode threshold, vehicle controller 120 may latch the engine speed to a minimum engine speed. Accordingly, vehicle controller 120, to control the engine speed while in the braking return deceleration state, may use a range associated with the decelerator input (e.g., between the reset threshold and the deceleration mode threshold) that is different from the range that vehicle controller 120 uses to control the engine speed while in the default deceleration state (e.g., between 0% and 100% and/or between 0% and the primary braking threshold).

Decelerator control may remain in braking return deceleration state 340 until the decelerator input satisfies the reset threshold or until the decelerator input satisfies a secondary braking threshold. If vehicle controller 120 determines that the decelerator input satisfies the reset threshold, decelerator control may return to default deceleration state 330. Accordingly, to get back to braking state 320 from default deceleration state 330, the decelerator input would have to satisfy the primary braking threshold.

As further shown in FIG. 3, while decelerator control is in braking return deceleration state 340, decelerator control may return to braking state 320 if a secondary braking threshold (e.g., 45%, 50%, 60%, and/or the like) is satisfied. The secondary braking threshold may correspond to the deceleration mode threshold (e.g., may be the same threshold value) and/or may be less than the primary braking threshold. Accordingly, if control is in braking return deceleration state 340, and the decelerator input satisfies the secondary braking threshold (e.g., due to the operator recompressing a decelerator pedal after the decelerator pedal was released beyond the deceleration mode threshold), decelerator control may return to braking state 320.

In this way, vehicle controller 120 may use state machine 300 to configure use of an engine decelerator based on the decelerator input associated with the decelerator input and the control state of the engine decelerator. As indicated above, FIG. 3 is provided merely as an example. Other examples may differ from what is described with regard to FIG. 3.

FIG. 4 is a flowchart of an example process 400 associated with a single pedal configuration for engine speed control and vehicle braking control. In some implementations, one or more process blocks of FIG. 4 may be performed by a vehicle controller (e.g., vehicle controller 120). Additionally, or alternatively, one or more process blocks of FIG. 4 may be performed by another device or a group of devices separate from or including the vehicle controller, such as an engine decelerator (e.g., engine decelerator 235), and/or the like.

As shown in FIG. 4, process 400 may include monitoring a setting of an engine decelerator associated with controlling an engine speed of an engine of a vehicle (block 410). For example, the vehicle controller (e.g., using processor 250 and/or any other type of control component) may monitor a setting of an engine decelerator associated with controlling an engine speed of an engine of a vehicle, as described above.

As further shown in FIG. 4, process 400 may include determining a decelerator input that corresponds to the setting of the engine decelerator (block 420). For example, the vehicle controller (e.g., using processor 250 and/or any other type of control component) may determine a decelerator input that corresponds to the setting of the engine decelerator, as described above. The decelerator input may correspond to the engine decelerator being within a threshold range of the position that corresponds to the decelerator input for a threshold length of time. The decelerator input may be determined based on a mapping of settings of the engine decelerator with corresponding decelerator inputs.

As further shown in FIG. 4, process 400 may include determining, based on the decelerator input, a control state of the engine decelerator (block 430). For example, the vehicle controller (e.g., using processor 250 and/or any other type of control component) may determine, based on the decelerator input, a control state of the engine decelerator, as described above.

As further shown in FIG. 4, process 400 may include determining, based on the control state associated with the engine decelerator, whether the setting of the engine decelerator is to be used to cause a braking device to stop the vehicle (block 440). For example, the vehicle controller (e.g., using processor 250 and/or any other type of control component) may determine, based on the control state associated with the engine decelerator, whether the setting of the engine decelerator is to be used to cause a braking device to stop the vehicle, as described above. The control state may be a current control state that is determined based on the decelerator input and a previous control state associated with the engine decelerator determined prior to the current control state being determined.

As further shown in FIG. 4, process 400 may include automatically causing, when the engine decelerator is determined to be used to cause the braking device to stop the vehicle, the braking device to apply an amount of braking to cause the vehicle to be stopped (block 450). For example, the vehicle controller (e.g., using processor 250 and/or any other type of control component) may automatically cause, when the engine decelerator is determined to be used to cause the braking device to stop the vehicle, the braking device to apply an amount of braking to cause the vehicle to be stopped, as described above. The vehicle controller may set the engine speed to a fixed braking engine speed value when the engine decelerator is determined to be used to cause the braking device to stop the vehicle.

According to some implementations, when the engine decelerator is not to be used to cause the braking device to stop the vehicle, the vehicle controller may automatically cause the braking device to apply an amount of braking to cause the vehicle to travel at a vehicle speed that corresponds to a transmission speed setting.

Process 400 may include additional implementations, such as any single implementation or any combination of implementations described in connection with one or more other processes described elsewhere herein. Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The disclosed vehicle controller 120 may be used with any vehicle that uses a powershift transmission and/or virtual gears in combination with the powershift transmission, such as a dozer, an excavator, a skid steer, and/or the like. The disclosed vehicle controller 120 may provide automatic braking based on a speed setting (e.g., a transmission speed setting), a transmission speed (e.g., a TOS, a TCOS, and/or the like), and/or a decelerator input of engine decelerator 235. For example, based on a decelerator input and/or control state associated with engine decelerator 235, vehicle controller 120 may control braking by brake system 225 to cause the vehicle to travel at a desired speed, to cause the vehicle to stop, to enable inching of the vehicle, to adjust engine 205 run at a desired engine speed, and/or the like.

While vehicle controller 120 can use a decelerator input of engine decelerator 235 to control braking of the vehicle to ensure that the vehicle travels at a desired speed with a desired engine speed, according to any suitable technique, the present disclosure enables vehicle controller 120 to use the decelerator input to control braking of the vehicle to cause the vehicle to stop and/or inch. In this way, rather than a second system (e.g., a brake pedal and/or corresponding system) needing to be activated by an operator to stop the vehicle, a single device or interface, such as a single decelerator pedal (e.g., engine decelerator 235) can be used by an operator to both adjust an engine speed and apply braking (e.g., depending on a position of the single decelerator pedal). Accordingly, to slow the vehicle to a stop and/or enable inching of the vehicle, vehicle controller 120 may cause brake system 225 to apply braking to drive system 240 corresponding to a setting of engine decelerator 235.

Accordingly, because only a single device (e.g., a single pedal) may be used to control an engine speed, a stopping ability, and/or an inching ability of a vehicle as described herein, implementing vehicle controller 120 may enhance an operator experience (by preventing an operator from needing to manually apply a brake via a separate device or control), may reduce operator errors (e.g., by avoiding a potential for the wrong pedal being activated by the operator), and may conserve resources (e.g., by preventing damage to vehicle hardware due to application of the wrong operator controlled device, and/or the like).

What is claimed is:

1. A vehicle controller for a vehicle, comprising:
one or more processors configured to:
determine a decelerator input associated with controlling an engine speed of an engine of the vehicle according to a transmission speed setting for a transmission associated with the engine;
determine, while the vehicle is moving and based on the decelerator input satisfying a braking threshold, that an engine decelerator, associated with the decelerator input, is to be enabled for use in stopping the vehicle;
determine, based on determining that the engine decelerator is to be used to cause the vehicle to be stopped, an amount of braking to be applied by a braking device of the vehicle to stop the vehicle; and
automatically cause the braking device to apply the amount of braking to stop the vehicle.

2. The vehicle controller of claim 1, wherein the one or more processors are further configured to:
designate, based on the decelerator input satisfying the braking threshold, the engine decelerator as being in a braking state,
wherein, while in the braking state, the engine decelerator is to be used to cause the braking device to apply braking to cause the vehicle to stop and set the engine speed to a fixed braking engine speed.

3. The vehicle controller of claim 2, wherein, while the engine decelerator is designated as being in the braking state, the vehicle controller is to determine the amount of braking based on a target vehicle speed corresponding to the decelerator input and the current vehicle speed of the vehicle.

4. The vehicle controller of claim 2, wherein the engine decelerator is designated to be in the braking state until the decelerator input satisfies a deceleration mode threshold.

5. The vehicle controller of claim 4, wherein the one or more processors are further configured to:
determine that the decelerator input satisfies the deceleration mode threshold; and
designate, based on the decelerator input satisfying the deceleration mode threshold, the engine decelerator as being in a deceleration state,
wherein, while in the deceleration state, the engine decelerator is to adjust the engine speed according to the decelerator input and is not to be used to cause the braking device to apply braking to cause the vehicle to stop.

6. The vehicle controller of claim 5, wherein, while in the deceleration state, the engine decelerator is used to adjust the engine speed based on the transmission speed setting and the decelerator input.

7. The vehicle controller of claim 5, wherein the braking threshold is a primary braking threshold and, while the engine decelerator is designated to be in a braking return deceleration state of the deceleration state, the one or more processors are further configured to:
determine that the decelerator input satisfies a secondary braking threshold without the decelerator satisfying a reset threshold; and
designate, based on the decelerator input satisfying the secondary braking threshold, the engine decelerator as being in the braking state.

8. The vehicle controller of claim 5, wherein, while the engine decelerator is designated to be in a braking return deceleration state of the deceleration state, the one or more processors are further configured to:
determine that the decelerator input satisfies a reset threshold; and
designate, based on the decelerator input satisfying the reset threshold, the engine decelerator as being in the deceleration state until the decelerator input satisfies the braking threshold.

9. A system of a vehicle, comprising:
an engine;
an engine decelerator configured to adjust an engine speed of the engine;
a brake system that includes a braking device; and
a vehicle controller configured to:
- monitor a decelerator input that corresponds to a setting of the engine decelerator;
- determine, based on a current decelerator input and a previous decelerator input, a control state associated with the engine decelerator; and
- perform, based on determining the control state and the decelerator input, an action to enable the engine decelerator to be used to at least one of:
  - cause the braking device to stop the vehicle, or
  - adjust the engine speed.

10. The system of claim 9, wherein the control state comprises at least one of:
- a braking state when the current decelerator input satisfies a braking threshold and the previous decelerator input does not satisfy the braking threshold,
  - wherein while in the braking state, the engine decelerator is to be used to cause the braking device to stop the vehicle, or
- a deceleration state when at least one of:
  - the current decelerator input and the previous decelerator input do not satisfy the braking threshold, or
  - the current decelerator input satisfies a deceleration mode threshold and the previous decelerator input does not satisfy the deceleration mode threshold.

11. The system of claim 10, wherein the braking threshold is based on a previous control state associated with the engine decelerator.

12. The system of claim 10, wherein, while in the deceleration state, the engine decelerator is designated to be in:
- a braking return deceleration state when the decelerator input satisfies the deceleration mode threshold after the engine decelerator is in the braking state, or
- a default deceleration state when at least one of:
  - the decelerator input satisfies a reset threshold after the engine decelerator is in the braking return deceleration state, or
  - the decelerator input does not satisfy the braking threshold after a startup operation associated with the vehicle controller.

13. The system of claim 12, wherein the vehicle controller, while the engine decelerator is designated to be in the braking return deceleration state, is to use a first range associated with the decelerator input to control the engine speed, and
wherein the vehicle controller, while the engine decelerator is designated to be in the default deceleration state, is to use a second range associated with the decelerator input to control the engine speed,
wherein the first range is different from the second range.

14. The system of claim 9, wherein the engine is coupled to a powershift transmission with at least two discrete gear ratios.

15. A method comprising:
- monitoring, by a vehicle controller, a setting of an engine decelerator associated with controlling an engine speed of an engine of a vehicle;
- determining, by the vehicle controller, a decelerator input that corresponds to the setting of the engine decelerator;
- determining, by the vehicle controller and based on the decelerator input, a control state of the engine decelerator;
- determining, by the vehicle controller and based on the control state associated with the engine decelerator, whether the setting of the engine decelerator is to be used to cause a braking device to stop the vehicle; and
- automatically causing, by the vehicle controller and when the engine decelerator is determined to be used to cause the braking device to stop the vehicle, the braking device to apply an amount of braking to cause the vehicle to be stopped.

16. The method of claim 15, further comprising:
automatically causing, when the engine decelerator is not to be used to cause the braking device to stop the vehicle, the braking device to apply an amount of braking to cause the vehicle to travel at a vehicle speed that corresponds to a transmission speed setting.

17. The method of claim 15, wherein the decelerator input corresponds to the engine decelerator being within a threshold range of the setting that corresponds to the decelerator input for a threshold length of time.

18. The method of claim 15, wherein the control state is a current control state and the current control state is determined based on the decelerator input and a previous control state associated with the engine decelerator determined prior to the current control state being determined.

19. The method of claim 15, further comprising:
setting the engine speed to a fixed braking engine speed value when the engine decelerator is determined to be used to cause the braking device to stop the vehicle.

20. The method of claim 15, wherein the decelerator input is determined based on a mapping of settings of the engine decelerator with corresponding decelerator inputs.

* * * * *